(12) United States Patent
Herranen et al.

(10) Patent No.: US 11,173,690 B2
(45) Date of Patent: Nov. 16, 2021

(54) MULTIPART LABEL LAMINATE, LABELS AND LABELLING

(71) Applicant: UPM RAFLATAC OY, Tampere (FI)

(72) Inventors: Jari Herranen, Tampere (FI); Markku Pietarinen, Tampere (FI); Pasi Lehtonen, Nokia (FI)

(73) Assignee: UPM RAFLATAC OY, Tampere (FI)

( * ) Notice: Subject to any disclaimer, the term of this patent is extended or adjusted under 35 U.S.C. 154(b) by 0 days.

(21) Appl. No.: 16/617,644

(22) PCT Filed: Jun. 2, 2017

(86) PCT No.: PCT/FI2017/050416
§ 371 (c)(1),
(2) Date: Nov. 27, 2019

(87) PCT Pub. No.: WO2018/220257
PCT Pub. Date: Dec. 6, 2018

(65) Prior Publication Data
US 2020/0180280 A1 Jun. 11, 2020

(51) Int. Cl.
*B32B 27/08* (2006.01)
*B32B 7/06* (2019.01)
*B32B 7/12* (2006.01)
*B32B 27/10* (2006.01)
*B32B 27/32* (2006.01)
(Continued)

(52) U.S. Cl.
CPC ............... *B32B 27/08* (2013.01); *B32B 7/06* (2013.01); *B32B 7/12* (2013.01); *B32B 27/10* (2013.01); *B32B 27/32* (2013.01); *B32B 27/36* (2013.01); *B65C 9/46* (2013.01); *G09F 3/0288* (2013.01); *G09F 3/10* (2013.01); *B32B 2307/41* (2013.01);
(Continued)

(58) Field of Classification Search
None
See application file for complete search history.

(56) References Cited

U.S. PATENT DOCUMENTS 4,968,559 A * 11/1990 Kuroda ..................... C09J 7/38
428/354
5,924,738 A * 7/1999 Konkol ................. G09F 3/0288
283/81

(Continued)

FOREIGN PATENT DOCUMENTS

| EP | 3023968 A1 | 5/2016 |
| WO | 2011036349 A1 | 9/2010 |
| WO | 2015118212 A1 | 8/2015 |

OTHER PUBLICATIONS

International Search Report for International Application No. PCT/FI2017/050416, International Filing Date Jun. 2, 2017, 4 pages.
(Continued)

*Primary Examiner* — Laura C Powers
(74) *Attorney, Agent, or Firm* — Cantor Colburn LLP

(57) ABSTRACT

The invention relates to a multipart label laminate for labelling of single-use sterilization packs, the multipart label laminate comprising a face layer, a first adhesive layer of acrylic based pressure sensitive adhesive, a carrier, a second adhesive layer of acrylic based pressure sensitive adhesive, a liner, and a printing ink layer between the carrier and the second adhesive layer. The invention further relates to a method for application of a multipart label.

11 Claims, 2 Drawing Sheets

(51) Int. Cl.
*B32B 27/36* (2006.01)
*B65C 9/46* (2006.01)
*G09F 3/02* (2006.01)
*G09F 3/10* (2006.01)

(52) U.S. Cl.
CPC ... *B32B 2307/736* (2013.01); *B32B 2307/748* (2013.01); *B32B 2519/00* (2013.01)

(56) References Cited

U.S. PATENT DOCUMENTS

| | | | | |
|---|---|---|---|---|
| 6,035,568 | A * | 3/2000 | Grosskopf | B65D 23/003 40/630 |
| 2004/0247837 | A1 | 12/2004 | Enlow et al. | |
| 2006/0078701 | A1 * | 4/2006 | Glasier | B31D 1/021 428/40.1 |
| 2010/0143647 | A1 * | 6/2010 | Tonniessen | C09J 5/00 428/137 |
| 2013/0192111 | A1 * | 8/2013 | Kennedy | G09F 3/0288 40/638 |
| 2014/0154442 | A1 * | 6/2014 | Bent | A61J 1/18 428/35.2 |
| 2017/0007464 | A1 * | 1/2017 | Liu | A61F 13/0259 |

OTHER PUBLICATIONS

Written Opinion for International Application No. PCT/FI2017/050416, International Filing Date Jun. 2, 2017, 5 pages.
Written Opinion for International Application No. PCT/FI2017/050416, International Filing Date Jun. 2, 2017, dated May 20, 2019, 6 pages.

* cited by examiner

MULTIPART LABEL LAMINATE, LABELS AND LABELLING

CROSS-REFERENCE TO RELATED APPLICATIONS

This application is a National Stage application of PCT/FI2017/050416, filed Jun. 2, 2017, incorporated by reference herein in its entirety.

TECHNICAL FIELD

The application relates to a multipart label laminate structure, multipart labels and labelling of such labels. Especially to the label structure used for labelling of single-use sterilization packs.

BACKGROUND

Multipart label laminates and labels include two pressure sensitive adhesive layers. The multipart label product comprises individual top labels, which are peelable from the multipart label product structure. Top labels are carried by an intermediate layer comprising a pressure sensitive adhesive layer. The intermediate layer stays on the labelled surface, when the top labels are removed and applied elsewhere. The multipart label products are typically used in industry, logistics, and pharmaceutical applications.

SUMMARY

It is an aim to provide a multipart label structure suitable for manual dispensing and application onto a surface of an item, such as a single-use sterilization pack. It is also an aim to provide easy and reliable application of both the multipart label structure and the individual top labels thereof.

According to an embodiment a multipart label laminate for labelling of single-use sterilization packs comprises following layers in the following order from top to bottom: a face layer; a first adhesive layer of acrylic based pressure sensitive adhesive; a carrier; a second adhesive layer of acrylic based pressure sensitive adhesive; a liner. Further the multipart label laminate comprises a printing ink layer between the carrier and the second adhesive layer.

According to an embodiment a method for application of a multipart label laminate comprises following steps: on-site printing of the face layer of the multipart label laminate so as to form printed multipart label including printed top labels; $1^{st}$ dispensing step comprising manual dispensing of the multipart label laminate by removing the liner; $1^{st}$ labelling step including manual application of the multipart label through the second adhesive layer onto a surface of an item; sterilization of the labelled item; $2^{nd}$ dispensing step comprising manual dispensing of the top labels from the carrier; $2^{nd}$ labelling step including manual application of the top labels through the first adhesive layer onto a surface of a final item.

Further embodiments of the application are presented in the dependent claims.

In an example, the face layer has opacity equal or more than 80%, when measured according to standard ISO 2471.

In an example, the face layer exhibits shrinkage less than 5%, or less than 1% at elevated temperatures up to 140 degrees C.

In an example, the first adhesive layer includes acrylic ester based polymer, an acrylic copolymer, a resin, a synthetic wax, and a polyurethane based rheology modifier.

In an example, the carrier is a plastic film comprising polyethylene terephthalate or polypropylene.

In an example, the carrier exhibits haze less than 10%, when measured according to standard ASTM D1003.

In an example, the carrier exhibits shrinkage less than 4%, when measured at 150 degrees C. for 30 minutes.

In an example, a low speed release force for separating the first adhesive layer from the carrier is between 20 and 150 cN/25 mm, when measured according to FINAT test method No. 3.

In an example, the carrier comprises printed graphics on a surface adjacent to the second adhesive layer.

In an example, the second adhesive layer includes a polymer of acrylic ester and styrene, a styrene/acrylic copolymer, an oil, a tackifier based on hybrid rosin ester and hydrocarbon resin.

In an example, the method comprises after $2^{nd}$ labelling step a step of removing a residual label material from the surface of the item labelled in the $1^{st}$ labelling step.

BRIEF DESCRIPTION OF THE DRAWINGS

In the following some examples and embodiments will be described in more detail with reference to appended drawings, in which.

DETAILED DESCRIPTION

In this description following reference numbers are used:
1 a multipart label laminate,
2 a face layer,
4 a carrier,
5 a first adhesive layer,
6 a liner,
7 a second adhesive layer,
10 an individual top label,
100 a multipart label product,
200 a surface of an item,
300 a printing ink layer.

Word "comprising" may be used as an open term, but it also comprises the closed term "consisting of". Unit of thickness expressed as microns corresponds to μm. Unit of temperature expressed as degrees C. corresponds to ° C.

Term "label" refers to a piece of material carrying information and/or providing visual appearance, which is to be applied onto items of different shapes and materials. A label comprising pressure sensitive adhesive may be referred to as a pressure sensitive adhesive (PSA) label. Pressure sensitive adhesive labels may also be referred to as self-adhesive labels. The labels comprising PSA can be adhered to most surfaces through the inherently tacky adhesive layer without the use of a secondary adhesive or agent, such as a solvent, or heat to strengthen the bond. The PSA of the label forms a bond when pressure is applied onto the label at ambient temperature (typically between 15 and 35° C.), adhering the label to the item to be labelled. Examples of pressure sensitive adhesives include water based (water-borne) PSAs, solvent based PSAs and solid PSAs. Solid PSAs are melted during application to the surface to be coated and may also be referred to as a hot-melt PSAs. PSAs can be formulated to work also outside the normal room temperatures like in freezer applications or also at higher temperature applications.

Self-adhesive labels may be used for pharmaceutical and health care labelling. In an example, self-adhesive labels may be used for providing improved traceability of the pharmaceutical and health care products. For traceability the labels may be designed as multipart labels. Such multipart labels allow transfer of the label or more typically, a part of the label (one of the top labels), from the original labelled item to another item. For example, a set of medical instruments is labelled with a multipart label and upon treating a patient with those instruments, a part of that label (top label) is transferred to the patient's documents allowing later to verify which set of instruments was used in the treatment of that particular patient. Such traceability may be used in connection with disposable instruments (to trace down to the producer or production batch of the instruments) and more typically in connection with reusable instruments (to trace down to the sterilization treatments and number of instances of use of the instruments).

Figure 1:
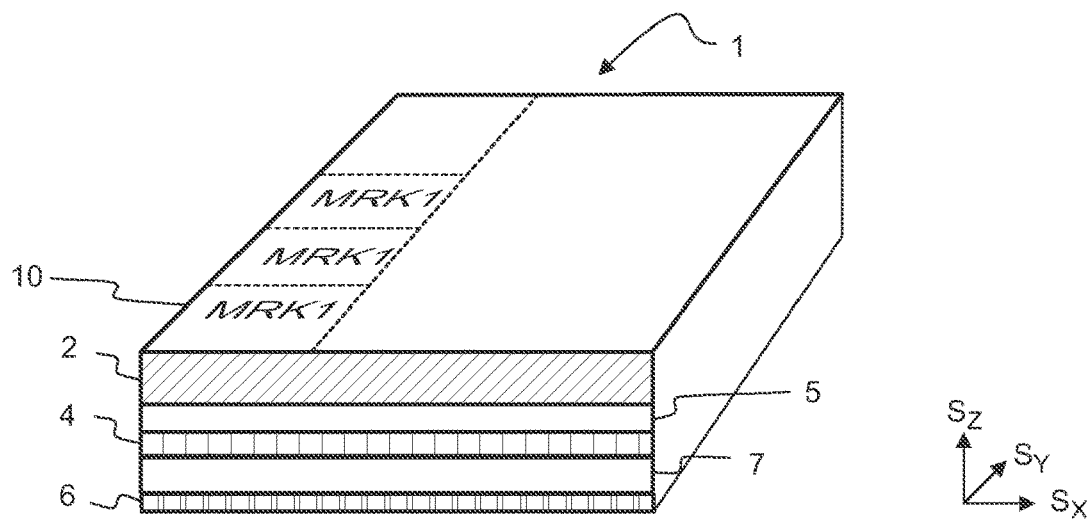
FIG. 1 shows an example of multipart label laminate structure.

With reference to FIG. 1, a multipart label laminate 1 has a multilayer construction comprising: a label face layer 2 on top of a carrier 4 and a liner 6. It further has a first adhesive layer 5 in between the face layer 2 and the carrier 4, and a second adhesive layer 7 in between the carrier 4 and the liner 6. The multipart label structure comprises individual top labels 10 that are die-cut. Top labels 10 are peelable from the carrier 4 and transferrable to another surface. Carrier and the second adhesive layer may be referred to as an intermediate layer. The intermediate layer stays on the labelled surface when the top labels are peeled and applied to another surface. Individual transferrable top label 10 comprises a label face layer 2 and a first adhesive layer 5. Preferably, it also comprises printed graphics MRK1 on a surface of the face layer so as to provide information and/or specific visual appearance.

Figure 2:
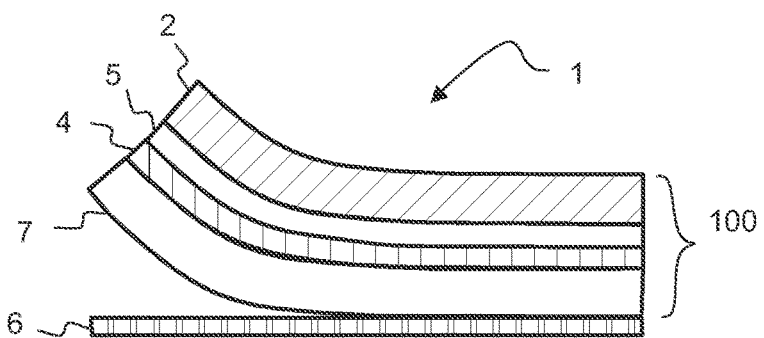
FIG. 2 shows a multipart label product released from a liner.
Figure 3:
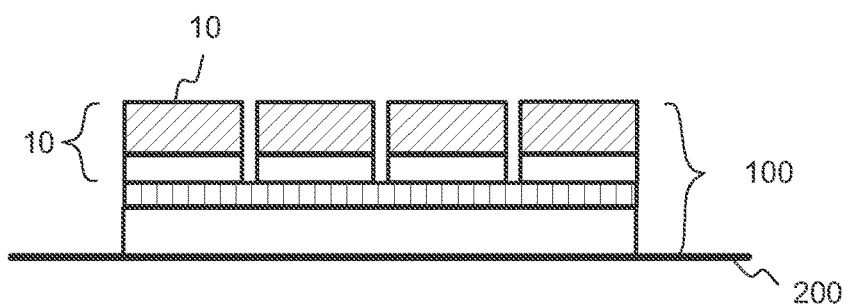
FIG. 3 shows a multipart label product attached to the surface of an item and comprising individual top layer labels.

With reference to FIG. 2, multipart label product 100 is a construction comprising a carrier 4, a first adhesive layer 5, second adhesive layer 7, and a face layer 2. Multipart label is a label construction which is attachable to a surface of an item. Multipart label is attachable after removal of the liner 6. Multipart label comprises further individual top labels 10 that are removable from a surface of the carrier and transferrable to another surface. The carrier and the second adhesive layer may be referred to as an intermediate layer carrying top labels 10. In FIG. 3 an example of a multipart label product 100 attached to the surface of an item 200 is presented.

The layers of the multipart label laminate are described below. The layers of the multipart label laminate are in the following order from top to bottom: a face layer 2, a first adhesive layer 5, a carrier 4, a second adhesive layer 7, and a liner 6.

Face Layer

A face layer 2 may be either plastic or paper based. Face layer is conformable to the surface of an item labelled.

Paper based face layer may have opacity equal or more than 80%, when measured according to standard ISO 2471. Opacity is a property of material that describes the amount of light which is transmitted through it. Material having a high degree of opacity does not let much light pass through it. The opacity of equal or more than 80% has effect on providing adequate contrast between the face layer and the printed graphics. Adequate contrast is required e.g. for machine reading of the printed codes, such QR-codes and barcodes.

A plastic face layer may comprise thermoplastic polymers, such as polyeolefin, polyester, polystyrene, polyurethane, polyamide, poly(vinylchloride) or any combination of these. Alternatively, the plastic face layer may be biodegradable, such as lactic acid, starch and/or cellulose based. In addition, face layer may comprise additives, such as pigments or inorganic fillers to provide, for example, desired colour for the face.

Alternatively, the plastic face layer may be cavitated so as to provide opaque (white) appearance.

Plastic face layer may have opacity equal or more than 80%, when measured according to standard ISO 2471. Thickness of the plastic face layer may be, for example equal or more than 36 µm. Thickness equal or more than 36 µm may also have effect on providing adequate contrast between the face layer and the printed graphics.

Face layer may have a monolayer structure. Alternatively it may have a multilayer structure comprising two or more layers. In an example, a face material may have a three layer structure.

The face layer is non-shrinkable and exhibits shrinkage less than 5%, or less than 1% at elevated temperatures up to 140 degrees C. The low shrinkage enables dimensional stability of the label also during sterilization step.

The face layer is suitable for printing. Face layer may be printed by using printing techniques, such as laser printing, digital printing, thermal transfer printing, and/or flexography. The printable face layer enables print to be legible also after sterilization of the label.

The face layer may enable subsequent recycling process of the labelled item.

First Adhesive Layer

A first adhesive layer 5 comprises a pressure sensitive adhesive of an acrylic water based adhesive. The first adhesive layer may also be referred to as a top adhesive layer.

The first adhesive layer includes aqueous dispersion of a polymer based on acrylic ester, an aqueous dispersion of acrylic copolymer, a resin dispersion, an oil in water emulsion, and a polyurethane based rheology modifier. Total amount of the components is 100%.

An amount of aqueous dispersion of an acrylic ester may be between 50 and 60%, or between 55 and 60% of the total weight of the first adhesive layer components. The aqueous dispersion of acrylic ester has solids content between 66 and 68%, when measured according to standard DIN EN ISO 3251. Further it has dynamic viscosity between 100 and 500 mPa·s, when measured according to standard DIN EN ISO 3219 at 23° C., 100 1/s. Glass transition temperature (Tg) may be approximately −58° C.

An amount of aqueous dispersion of acrylic copolymer may be between 10 and 25 wt. %, or between 15 and 20 wt. %. The aqueous dispersion of acrylic copolymer may be vinyl/acrylic copolymer The acrylic copolymer may have effect on preventing bleeding of the adhesive layer in autoclave sterilization environment.

An amount of resin dispersion may be between 10 and 25 wt. %, or between 15 and 20 wt. %. The resin dispersion may be stabilized rosin ester dispersion based on pine. The rosin ester dispersion acts as a tackifier. It may provide superior adhesive performance to a wide range of substrates, such as paper. It is 100% solvent free dispersion. It exhibits high softening point and offers very high cohesion as well as good mechanical stability. It also provides good water and heat resistance. It may have effect on improving adhesion of high and low energy surfaces.

An amount of oil in water emulsion may be between 4 and 8 wt. %, or between 5 and 7 wt. %. The oil in water emulsion may be a blend of functional synthetic waxes in water. Amount of solid waxes may be 47%. Viscosity may be 200 cp. IT may have effect on minimizing bleeding of the adhesive layer. It may further have effect on preventing loss of adhesion with time.

An amount of polyurethane based rheology modifier may be less than 1%, or less than 0.5%. For example between 0.05 and 0.5% or between 0.05 and 0.2 wt. %. The polyurethane based rheology modifier may be hydrophobically modified ethylene oxide urethane (HEUR). Its solids content may be about 20%. The rheology modifier may have effect on providing better performance for the adhesive layer during coating of the adhesive layer.

Adhesive coat weight of the first adhesive layer may be between 10 and 20 g/m$^2$. The first adhesive layer may exhibit tack equal or more than 10 N/25 mm, when measured using glass surface. It further retains its properties during sterilization so as to provide suitable adherence required for labelling e.g. sufficient adherence towards paper documentation.

Preferably the adhesive is food contact approved. It may also exhibit low heavy metal/formaldehyde content. In an example, the adhesive confirms both with FDA indirect food contact (FDA 175.105) and EU food contact regulations (EU 1935/2004). The food contact approval and low heavy metal/formaldehyde content have effect on providing labelling with minimized risk of chemical adverse effects and contamination of the labelled product.

The first adhesive has effect on retaining its tack properties in autoclave sterilization environment so as be able to attach individual labels 10 to a surface of an item after sterilization process. The adhesive does not release from the carrier during sterilization process i.e. the individual labels are affixed to the carrier up to the point of labelling without lifting of edges.

Carrier

A carrier 4 is a material layer that carries the face layer and is attached together with the face layer to the surface of the product to be labelled. Carrier is attached through a second adhesive layer 7 to the surface of the product to be labelled. Preferably, the carrier is plastic, such as a monolayer or multilayer plastic film. Preferably the carrier has good moisture resistance.

According to an embodiment, the carrier comprises or consists of polyester, such as polyethylene terephthalate (PET). Alternatively, the carrier comprises or consists of polypropylene (PP). The carrier may be oriented, such as uniaxially oriented in machine direction of the carrier. The carrier may have a single layer (monolayer) structure. Alternatively, the carrier may include several layers so as to provide a multilayer structure.

Preferably, the carrier is transparent. Transparent carrier is substantially transparent to visible light. Transparency provides objects beneath the carrier, such as surface labelled or reverse side printed graphics, to be visible through the carrier. Transparent carrier material exhibits haze less than 25% or less than 10%, for example between 2 and 6%, or between 4 and 5%, when measured according to standard ASTM D1003.

Total thickness of the carrier may be between 8 and 50 μm, or between 12 and 40 μm, or between 15 and 30 μm. A carrier consisting of polyester may have a thickness of, for example, 23 μm, 18 μm or 12 μm. The carrier need to have properties allowing the carrier to conform to the surface of the product attached.

The carrier is non-shrinkable and exhibits shrinkage less than 4%, when measured at 150 degrees C. for 30 minutes. The low shrinkage enables dimensional stability of the label also during sterilization step.

Further, the carrier is able resist heat, humidity, radiation and/or chemicals, such as ethylene oxide, associated with the subsequent sterilization cycle of the labelled product.

The carrier 4 comprises a release coating layer on a first surface of the carrier. First surface of the carrier is the surface, which is towards a first adhesive layer 5. The release coting layer may comprise release agent, such as silicone. The release coating layer provides a non-adherent surface and low adhesion release effect against the adjacent adhesive layer. Composition of the substrate may have effect on anchorage of the silicone layer to the substrate.

The carrier may have low speed release force value between 20 and 150 centiNewtons (cN)/25 mm, defined as the force required to separate the first adhesive layer and measured according to, FINAT test method No. 3 (Finat Technical Handbook, 9$^{th}$ edition).

Figure 4:
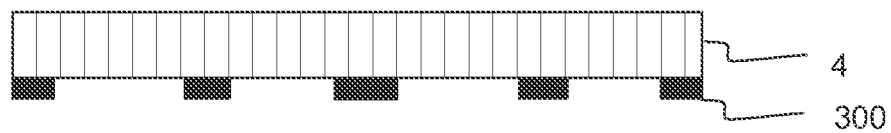
FIG. 4 shows a carrier.

With reference to FIG. 4, the carrier 4 comprises printed graphics i.e. printing ink layer 300 on a second surface of the carrier. The second surface of the carrier is towards the second adhesive layer. The printing ink layer is adjacent to the second surface of the carrier. In other words, the carrier comprises printing ink layer on the reverse side of the carrier so that the printing ink layer is in between the carrier and a second adhesive layer in the multipart label structure. The ink layer may be visible through the carrier. The ink layer may be continuous or it may be discontinuous. The ink layer may have specific pattern, such as lines or characters. The ink layer is suitable for steam sterilization enabling print to be legible after sterilization. The printing ink layer has effect on providing visual information for helping manual labelling. It may further have effect on providing visual information for easy detection of the trace label material left in the labelled product, for example from discarded wrap material before re-cycling the wrap material.

Second Adhesive Layer

A second adhesive layer 7 comprises a pressure sensitive adhesive of acrylic water based adhesive. The second adhesive layer may also be referred to as a bottom adhesive layer.

The second adhesive layer includes aqueous dispersion of a polymer based on acrylic ester and styrene, an aqueous dispersion of styrene/acrylic copolymer, an oil in water emulsion, an aqueous tackifier based on hybrid rosin ester and hydrocarbon resin. Further the adhesive layer includes additives for assisting the manufacturing, such as coating of the adhesive layer. The additives include wetting agent, defoamer and rheology modifier. Total amount of the components is 100%.

An amount of aqueous dispersion of acrylic ester/styrene may be between 30 and 50 wt. %, or between 35 and 45 wt. %. The aqueous dispersion of a polymer based on acrylic ester and styrene has solids content approximately 65%, when measured according to standard DIN EN ISO 3251. Further it has dynamic viscosity between 50 and 500 mPa·s, when measured according to standard DIN EN ISO 3219 at 23° C., 100 1/s. The acrylic ester/styrene dispersion has effect on providing good adhesion to plastic film surface, such as to polypropylene surface. It further tolerates sterilization environments, such as autoclave.

An amount of aqueous dispersion of styrene/acrylic copolymer may be between 7 and 20 wt. %, or between 10 and 15 wt. %. The aqueous dispersion has viscosity max 1000 mPa·s at 25° C. and solids content about 60%. It may have effect on improving the initial adhesion of the adhesive layer on surface attached, such as non-woven wrap surface.

An amount of of oil in water emulsion may be between 5 and 15 wt. %, or between 8 and 12 wt. %. The oil in water emulsion may be a blend of functional synthetic waxes in water. Amount of solid waxes may be 47%. Viscosity may be 200 cp. It may have effect on minimizing bleeding of the adhesive layer. It may further have effect on preventing loss of adhesion with time.

An amount of an aqueous tackifier based on hybrid rosin ester and hydrocarbon resin may be between 30 and 40 wt. %, or between 32 and 38 wt. %. It may have solids content approximately 53%, Brookfield viscosity at 20° C., 50 $min^{-1}$, 300 mPa·s. It may have effect on providing good final adhesion on substrate attached, such as non-woven wrap.

An amount of wetting agent may be less than 1%, for example between 0.2 and 1 wt. %, or between 0.5 and 0.7 wt. %

An amount of defoamer may be less than 0.5%, for example between 0.05 and 0.5%, or between 0.1 and 0.3 wt. %.

An amount of rheology modifier may be may be less than 0.5%, for example between 0.05 and 0.2 wt. %. The polyurethane based rheology modifier may be hydrophobically modified ethylene oxide urethane (HEUR). Its solids content may be about 20%. The rheology modifier may have effect on providing better performance for the adhesive layer during coating of the adhesive layer.

Adhesive coat weight of the second adhesive layer may be between 25 and 40 g/m². In an example, the second adhesive layer exhibits tack on PP surface equal or more than 15 N/25 mm.

The second adhesive exhibits in less than 1 minute tack more than 15 N/25 mm, preferably more than 20 N/25 mm or more than 25 N/25 mm, when measured according to FINAT test method No. 9 (Finat Technical Handbook, $9^{th}$ edition). The tack has effect on providing easy manual application of the multipart label without need of extra pressure to be provided during labelling.

Preferably the adhesive is food contact approved. It may also exhibit low heavy metal/formaldehyde content. In an example, the adhesive confirms both with FDA indirect food contact (FDA 175.105) and EU food contact regulations (EU 1935/2004). The food contact approval and low heavy metal/formaldehyde content have effect on providing labelling with minimized risk of chemical adverse effects and contamination of the labelled product.

The second adhesive layer has effect on retaining its adhesion in autoclave sterilization environment including steam, pressure and heat. The second adhesive exhibits good adhesion during sterilization process so that the multipart label is firmly attached in the labelled product without need of extra tape.

Liner

A liner 6 is a material layer used for protecting the adjacent adhesive layer, namely a second adhesive layer 7. It also allows easier handling of the label laminate structure up to the point of labelling where the label structure is dispensed and adhered to a surface of an item. In a labelling step the release liner is removed and disposed of. Release liner serves one or more useful functions: it is used as a carrier sheet onto which the adhesive may be coated; it protects the adhesive layer during storage and transportation; it provides support for labels during die-cutting and printing, and ultimately it releases from the adhesive leaving it undamaged.

The liner comprises a substrate, which may be paper based. Alternatively the substrate may be plastic. The release liner may comprise one of the following substrates: glassine paper, kraft paper and polymeric (polymer based) film.

According to an embodiment, the substrate of the release liner is polymer based. The substrate may comprise or consist of polyester, such as polyethylene terephthalate (PET). Alternatively, the substrate may comprise or consist of polypropylene (PP). The substrate may be oriented, such as uniaxially oriented in machine direction of the substrate. The polymer based substrate may have a single layer (monolayer) structure. Alternatively, the substrate may include several layers so as to provide a multilayer structure.

Total thickness of the substrate may be between 8 and 50 µm, or between 12 and 40 µm, or between 15 and 30 µm. A substrate consisting of polyester may have a thickness of, for example, 23 µm, 18 µm or 12 µm. Thin substrate may effect on sustainable development reducing the amount of waste material to be disposed of.

Further the liner comprises a release coating layer on the surface of the substrate. The release coting layer may comprise release agent, such as silicone. The release coating layer provides a non-adherent surface and low adhesion release effect against the adjacent adhesive layer. Composition of the substrate may have effect on anchorage of the silicone layer to the substrate.

Multipart label may further include sterilization indicator. Sterilization indicator may be provided, for example, by printing the label using ink, which is responsive to sterilization. In an example, the sterilization ink may change colour due to the exposure to heat, humidity, radiation and/or chemicals associated with sterilization cycle. In an example, ink changing colour due to the sterilization indicates that the label and the labelled item has been exposed to sterilization cycle and is ready for use.

Use

Multipart label laminate 1 is suitable for labelling of single-use sterilization packs such as wraps and pouches. Sterilization wraps/pouches are used for wrapping of surgical instruments prior to sterilization, such as steam-autoclave sterilization. A variety of wrapping materials may be used. Wrapping/pouch materials are permeable to steriliant, such as steam applied during sterilization. In addition, they are able to provide barrier to microbial penetration after sterilization. For example, sterilization wrapping sheets may be medical grade paper, creped paper or non-woven wraps comprising thermoplastic fibers, such as polypropylene and or polyethylene fibers. Sterilization pouches may be based on flash spun high density polyethylene fibers, such as Tyvek® or papers suitable for sterilization. Sterilization pouches may further include areas of non-porous material, such as non-porous plastic window.

Before sterilization surgical instruments are placed in a tray; the tray is wrapped with wrap material and folded over to enclose the instruments in the wrap. Subsequently, the multipart identification label is attached to the surface of the wrap so as to provide labelled wrap of instruments for identification and traceability. The multipart label is printed and so as to carry information about the wrapped article(s) such as date and load number of sterilization. During surgery the information of the multipart label may be included into the patient records either by labelling individual top label(s) or by optically reading the information from the label.

At completion of the surgery, the wrap including residual label material are discarded. The residual label material may comprise a second adhesive layer 7 and a carrier 4. The second adhesive and the carrier may be referred to as an intermediate layer. Residual material may also include excess individual top label(s) comprising a first adhesive layer and a face layer.

The wrap material may be recyclable. However, the label material may contaminate the recyclable material. Selecting suitable label materials, combination of the wrap comprising the residual label material can be recycled without further separation steps.

An application cycle of multipart label 100 according to the invention comprises the following steps:
- on-site printing of the face layer 2 of the multipart label laminate 1 so as to provide up to date information for the individual top labels 10;
- $1^{st}$ dispensing step comprising manual dispensing of the multipart label laminate by removing the liner 6;
- $1^{st}$ labelling step including manual application of the multipart label 100 through the second adhesive layer 7 onto a surface of an item, such as surface of the wrap or pouch material enclosing the surgical instruments;
- sterilization of the labelled item;
- $2^{nd}$ dispensing step comprising manual dispensing of the individual top labels 10 from the carrier 4;
- $2^{nd}$ labelling step including manual application of the individual top labels 10 through the first adhesive layer 5 onto a surface of an item, such as from the wrap enclosing the surgical instruments onto the papers of the patient register.

An application cycle of multipart label may also be referred to as a labelling cycle.

In the $1^{st}$ labelling step the multipart label may be applied onto the seam area of the wrapping so as to form a seal for the wrapping to close the wrap. Thus further closing means, such as tapes, may not be needed. The item labelled in the $1^{st}$ labelling step may be called as an intermediate item.

In the $2^{nd}$ labelling step the item labeled using the top labels may be called as a final item. The top labels are permanently attached to the final item(s).

The application cycle may further include removing of the residual label material form the surface of the wrap or pouch material prior to reuse of the wrap or pouch material. The residual label material comprises a second adhesive layer 7 and a carrier 4. It may also include excess individual top label(s) comprising a first adhesive layer and a face layer. Removal of the residual label material has effect on enhancing the recycling of the used wrap/pouch materials.

The application cycle comprising multiple steps sets several requirements for the multipart label structure and components of the label structure, such as heat resistance, suitability for two separate labelling steps and recyclability. The multipart label structure according to the embodiments disclosed above have effect on providing easy and reliable label application cycle.

In an example, due to the optimized combination of the carrier and the first adhesive the individual labels are not only easily releasable from the carrier but also easily attached to the final destination, such as papers of the patent register.

The invention claimed is:

1. A multipart label laminate for labelling of single-use sterilization packs, the multipart label laminate comprising following layers in the following order from top to bottom:
    a face layer;
    a first adhesive layer of acrylic based pressure sensitive adhesive;
    a carrier;
    a second adhesive layer of acrylic based pressure sensitive adhesive;
    a liner,
wherein the multipart label laminate further comprises a printing ink layer between the carrier and the second adhesive layer; wherein the multipart label laminate comprises die-cut top labels comprising the face layer and the first adhesive layer; and
wherein the multipart label is attachable to a surface of an item and the top labels are removable from the carrier and transferrable to another surface;
wherein the face layer is plastic-based and exhibits shrinkage of less than 5% at elevated temperature up to 140° C., and
wherein the carrier is a monolayer or multilayer plastic film which exhibits shrinkage of less than 4% when measured at 150° C. for 30 minutes.

2. A multipart label laminate according to claim 1, wherein the face layer has opacity equal or more than 80%, when measured according to standard ISO 2471.

3. A multipart label laminate according to claim 1, wherein the face layer exhibits shrinkage less 1% at elevated temperatures up to 140 degrees C.

4. A multipart label laminate according to claim 1, wherein the first adhesive layer includes acrylic ester based polymer, an acrylic copolymer, a resin, a synthetic wax, and a polyurethane based rheology modifier.

5. A multipart label laminate according to claim 1, wherein the carrier comprises polyethylene terephthalate or polypropylene.

6. A multipart label laminate according to claim 1, wherein the carrier exhibits haze less than 10%, when measured according to standard ASTM D1003.

7. A multipart label laminate according to claim 1, wherein a low speed release force for separating the first adhesive layer from the carrier is between 20 and 150 cN/25 mm, when measured according to FINAT test method No. 3.

8. A multipart label laminate according to claim 1, wherein the carrier comprises printed graphics on a surface adjacent to the second adhesive layer.

9. A multipart label laminate according to claim 1, wherein the second adhesive layer includes a polymer of acrylic ester and styrene, a styrene/acrylic copolymer, an oil, a tackifier based on hybrid rosin ester and hydrocarbon resin.

10. A method for application of a multipart label laminate according to claim 1, the method comprising following steps:
    on-site printing of the face layer of the multipart label laminate so as to form printed multipart label including printed top labels;
    $1^{st}$ dispensing step comprising manual dispensing of the multipart label laminate by removing the liner;
    $1^{st}$ labelling step including manual application of the multipart label through the second adhesive layer onto a surface of an item;
    sterilization of the labelled item;
    $2^{nd}$ dispensing step comprising manual dispensing of the top labels from the carrier;
    $2^{nd}$ labelling step including manual application of the top labels through the first adhesive layer onto a surface of a final item.

11. A method for application according to claim 10, wherein the method comprises after the $2^{nd}$ labelling step a step of removing a residual label material from the surface of the item labelled in the Pt labelling step.

\* \* \* \* \*